(12) United States Patent
Swinton

(10) Patent No.: US 7,720,924 B2
(45) Date of Patent: May 18, 2010

(54) SYSTEM PROVIDING METHODOLOGY FOR THE RESTORATION OF ORIGINAL MEDIA QUALITY IN MESSAGING ENVIRONMENTS

(75) Inventor: William G. Swinton, Santa Cruz, CA (US)

(73) Assignee: Syniverse ICX Corporation, Tampa, FL (US)

( * ) Notice: Subject to any disclaimer, the term of this patent is extended or adjusted under 35 U.S.C. 154(b) by 1151 days.

(21) Appl. No.: 10/707,435

(22) Filed: Dec. 12, 2003

(65) Prior Publication Data

US 2005/0132015 A1    Jun. 16, 2005

(51) Int. Cl.
G06F 15/16 (2006.01)

(52) U.S. Cl. .............. 709/207; 709/205; 709/206; 709/224; 358/402

(58) Field of Classification Search ............... 709/205, 709/206, 207
See application file for complete search history.

(56) References Cited

U.S. PATENT DOCUMENTS

| | | | | |
|---|---|---|---|---|
| 5,528,293 A | 6/1996 | Watanabe | ............... | 348/231.2 |
| 5,528,705 A | 6/1996 | Reasoner et al. | ............ | 382/306 |
| 5,548,789 A | 8/1996 | Nakanura | | |
| 5,719,717 A | 2/1998 | Leonhardt et al. | ............. | 360/48 |
| 5,729,741 A | 3/1998 | Liaguno et al. | .......... | 707/104.1 |
| 5,751,281 A | 5/1998 | Hoddie et al. | ............ | 715/500.1 |
| 5,761,606 A | 6/1998 | Wolzien | ..................... | 725/110 |
| 5,781,901 A | 7/1998 | Kuzma | | |
| 5,826,023 A | 10/1998 | Hall et al. | | |
| 5,896,502 A | 4/1999 | Shieh et al. | | |
| 5,903,723 A | 5/1999 | Gabbard et al. | | |
| 5,905,800 A | 5/1999 | Moskowitz et al. | ........... | 380/28 |
| 5,991,426 A | 11/1999 | Cox et al. | .................. | 382/100 |
| 6,024,287 A | 2/2000 | Takai et al. | .................. | 235/493 |
| 6,101,320 A | 8/2000 | Schuetze et al. | | |
| 6,198,941 B1 | 3/2001 | Aho et al. | | |
| 6,233,736 B1 | 5/2001 | Wolzien | ..................... | 725/110 |
| 6,249,870 B1 | 6/2001 | Kobayashi et al. | .......... | 713/176 |
| 6,256,416 B1 | 7/2001 | de Queiroz | ................. | 382/232 |
| 6,256,666 B1 | 7/2001 | Singhal | | |
| 6,268,849 B1 | 7/2001 | Boyer et al. | ................. | 725/40 |
| 6,286,100 B1 | 9/2001 | Morimoto et al. | .......... | 713/176 |

(Continued)

FOREIGN PATENT DOCUMENTS

EP    0950969    10/1999

(Continued)

*Primary Examiner*—Hassan Phillips
*Assistant Examiner*—Glenford Madamba
(74) *Attorney, Agent, or Firm*—Blakely, Sokoloff, Taylor & Zafman, LLP; Judith A. Szepesi

(57) ABSTRACT

A system providing methodology for the restoration of original media quality in messaging environments is described. In one embodiment, for example, deployed in a messaging system, a method of the present invention is described for restoring media items to original quality, the method comprises steps of: upon receipt of a message containing an original media item that is new, storing the original media item in a repository; generating an identifier for identifying the original media item stored in the repository; replacing the original media item in the message with a substitute copy that includes the identifier; and upon future encounter of a particular media item having the identifier, restoring the particular media item to original quality using the identifier.

54 Claims, 9 Drawing Sheets

U.S. PATENT DOCUMENTS

| | | | |
|---|---|---|---|
| 6,297,830 B1 | 10/2001 | Hoddie et al. | 345/473 |
| 6,304,966 B1 | 10/2001 | Shimizu | 713/100 |
| 6,311,215 B1 | 10/2001 | Bakshi et al. | |
| 6,330,068 B1 | 12/2001 | Matsuyama | |
| 6,360,252 B1 | 3/2002 | Rudy et al. | |
| 6,385,329 B1 | 5/2002 | Sharma et al. | 382/100 |
| 6,385,342 B1 | 5/2002 | de Queiroz | 382/233 |
| 6,424,725 B1 | 7/2002 | Rhoads et al. | 382/100 |
| 6,442,285 B2 | 8/2002 | Rhoads et al. | 382/100 |
| 6,449,658 B1 | 9/2002 | Lafe et al. | |
| 6,457,044 B1 | 9/2002 | IwaZaki | |
| 6,460,086 B1 | 10/2002 | Swaminathan et al. | 709/236 |
| 6,480,853 B1 | 11/2002 | Jain | |
| 6,493,745 B1 | 12/2002 | Cherian | 709/206 |
| 6,499,057 B1 | 12/2002 | Portuesi | 709/217 |
| 6,505,160 B1 | 1/2003 | Levy et al. | 704/270 |
| 6,505,236 B1 | 1/2003 | Pollack | |
| 6,509,910 B1 | 1/2003 | Agarwal et al. | |
| 6,522,769 B1* | 2/2003 | Rhoads et al. | 382/100 |
| 6,535,586 B1 | 3/2003 | Cloutier et al. | 379/88.13 |
| 6,564,253 B1 | 5/2003 | Stebbings | 709/217 |
| 6,598,076 B1 | 7/2003 | Chang et al. | |
| 6,611,599 B2 | 8/2003 | Natarajan | 381/376 |
| 6,615,268 B1 | 9/2003 | Philyaw et al. | 474/69 |
| 6,628,843 B1 | 9/2003 | Eschbach et al. | 435/182 |
| 6,643,692 B1 | 11/2003 | Philyaw et al. | 709/219 |
| 6,734,994 B2 | 5/2004 | Omori | |
| 6,742,043 B1 | 5/2004 | Moussa et al. | |
| 7,054,905 B1 | 5/2006 | Hanna et al. | |
| 2001/0049648 A1 | 12/2001 | Naylor et al. | |
| 2001/0054075 A1 | 12/2001 | Miyanaga | |
| 2002/0120693 A1 | 8/2002 | Rudd et al. | |
| 2002/0135794 A1* | 9/2002 | Rodriguez et al. | 358/1.15 |
| 2002/0151283 A1 | 10/2002 | Pallakoff | |
| 2002/0169823 A1 | 11/2002 | Coulombe et al. | |
| 2003/0093565 A1 | 5/2003 | Berger et al. | |
| 2003/0115277 A1 | 6/2003 | Watanabe et al. | |
| 2004/0078304 A1 | 4/2004 | Gabbard et al. | |
| 2005/0091367 A1* | 4/2005 | Pyhalammi et al. | 709/224 |
| 2006/0031297 A1* | 2/2006 | Zuidema | 709/206 |
| 2007/0098172 A1* | 5/2007 | Levy et al. | 380/247 |

FOREIGN PATENT DOCUMENTS

| | | |
|---|---|---|
| WO | PCT/GB00/01962 | 11/2000 |
| WO | PCT/SE00/00807 | 1/2001 |
| WO | PCT/KR01/01323 | 2/2002 |

* cited by examiner

SYSTEM PROVIDING METHODOLOGY FOR THE RESTORATION OF ORIGINAL MEDIA QUALITY IN MESSAGING ENVIRONMENTS

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to preservation of media (e.g., images, audio, video, documents, and the like) quality, and relates more particularly to restoring media quality in messaging environments.

2. Description of the Background Art

MMS (Multimedia Messaging Service) is a universally accepted standard that lets users of MMS supportive mobile phones send and receive messages with formatted text, graphics, photographs, audio, and video clips. Video sequences, audio clips, and high-quality images can be downloaded to the phone from WAP (Wireless Application Protocol) sites, transferred to the phone via an attached accessory (e.g., a digital camera), or received in an MMS message. MMS messages can be sent either to another MMS-enabled mobile phone or to an e-mail address. Photos, sound clips, and video clips can also be stored in the phone for later use. MMS supports standard image formats such as GIF and JPEG, video formats such as MPEG 4, and audio formats such as MP3 and MIDI. Multimedia messaging requires high transmission speeds, which can be provided by GPRS and 3G. To support the MMS technology, existing GSM or CMDA networks need an MMS-C (Multimedia Messaging Service Center).

These multimedia messaging environments provide a message generation service that allows a variety of message elements to be sent to a user. These message elements can contain text, animations, photographs, and sounds. In the future they may contain streaming audio and video. Users can compose their own messages, receive rich content messages from content providers, and forward them onto their own contacts. Examples include:

Taking a snapshot via a camera phone and sending to a friend

Composing your own animated picture messages and sending to friends

Sending audio files

Sending pictures & audio files with simultaneous playback

Receiving a picture postcard annotated with text and/or an audio clip

Further, the user can also send messages from a variety of devices, including mobile phones, PDAs, Palm Pilots, or PCs. MMS makes it possible for mobile users to send these multimedia messages from MMS-enabled handsets to other mobile users and to e-mail users. It also makes it possible for mobile users to receive multimedia messages from other mobile users, e-mail users, and from multimedia-enabled applications.

In messaging systems like MMS, there is no central repository for storing media items or objects that are shared among subscribers. This is in contrast to many picture mail services, where a central switching server also stores the media objects (e.g., components in user-composed messages) centrally and persistently. In MMS, messages are instead created, and objects are sourced, at individual devices or terminals connected to the system without any central storage mechanism. Although a central switch in the form of a server may be employed to facilitate message delivery, the central switch or server does not attempt to operate as a central repository for storing or retaining media objects (unlike, say, picture mail services). MMS messages are composed using a standards-compliant messaging format and sent through a switch (e.g., MMSC for a MMS system) to one or more destinations (i.e., target devices or terminals). This is a "stored forward" approach, such that a given a message and its associated objects are stored on a temporary basis. Although the media objects may pass through one or more servers, any storage is at most transient in MMS systems; instead, the message and its media objects are stored just long enough to achieve delivery of the message. Once a given message has reached its target destination, the message's media objects will typically have been transcoded or otherwise decimated (e.g., convert media format, size, or the like), in an effort to optimize the rendering of the media objects for the target destination. Upon successful delivery of the message, the message itself and all of its associated media objects are discarded from temporary storage (e.g., at the central switch), or moved to off-line archival storage.

Given the simplicity of the MMS model where the central switch is only a transient switch, any high-quality media (e.g., audio, video, still images, etc.) that is destined for target devices that have less than full capability for rendering (e.g., less-capable display) will undergo quality degradation. In particular, the MMS-C switch will take the original high-quality media and create new lower-quality versions. Consider, for example, an original high-quality image. Here, the switch will often need to create a lower resolution image, in order to provide an appropriately-formatted image for the destination device. Apart from capability constraints of a given target device, bandwidth constraints may also mandate that media objects be converted into lower-quality copies (to conserve bandwidth). The destination device may use received media objects for composing other messages (e.g., forward or reply messages), but because of the foregoing degradation process the reused media objects become progressively poorer in quality. The scenario is similar to faxing and re-faxing a document. By the time the document has been faxed three or four times, the quality has degraded to the point where the fax copy is no longer usable. In the particular context of MMS, since there is no central repository for storing media objects, once a given media object has been degraded, the high quality of the original is not preserved because the association with the original media object has itself not been preserved. Overall, this leads to loss of quality and loss of flexibility for media items that are used in multimedia messaging systems.

In messaging systems of this type, as soon as the original media object (that is part of a message) is transcoded or otherwise converted for delivery to another mobile or terrestrial terminals, the original media quality is lost to the system (i.e., for subsequent use). To the point, the quality of delivered original media objects is forever lost for subsequent users as the system does not retain the quality in any way, shape, or form. Subsequent users of these delivered media items or objects (for new messages) are forever constrained to work with subsequent lower-quality versions.

SUMMARY OF INVENTION

A system providing methodology for the restoration of original media quality in messaging environments is described. In one embodiment, for example, deployed in a messaging system, a method of the present invention is described for restoring media items to original quality, the method comprises steps of: upon receipt of a message containing an original media item that is new, storing the original media item in a repository; generating an identifier for identifying the original media item stored in the repository; replacing the original media item in the message with a substitute copy that includes the identifier; and upon future encounter of a particular media item having the identifier, restoring the particular media item to original quality using the identifier.

In another embodiment, for example, a system of the present invention is described for restoring media items to original quality, the system comprises: a messaging system capable of transmitting multimedia messages; a repository for storing the original media item upon receipt of a message containing an original media item that is new; a module for generating an identifier for identifying the original media item stored in the repository; a module for replacing the original media item in the message with a substitute copy that includes the identifier; and a module for restoring the particular media item to original quality using the identifier.

DETAILED DESCRIPTION

Glossary

Figure 1:
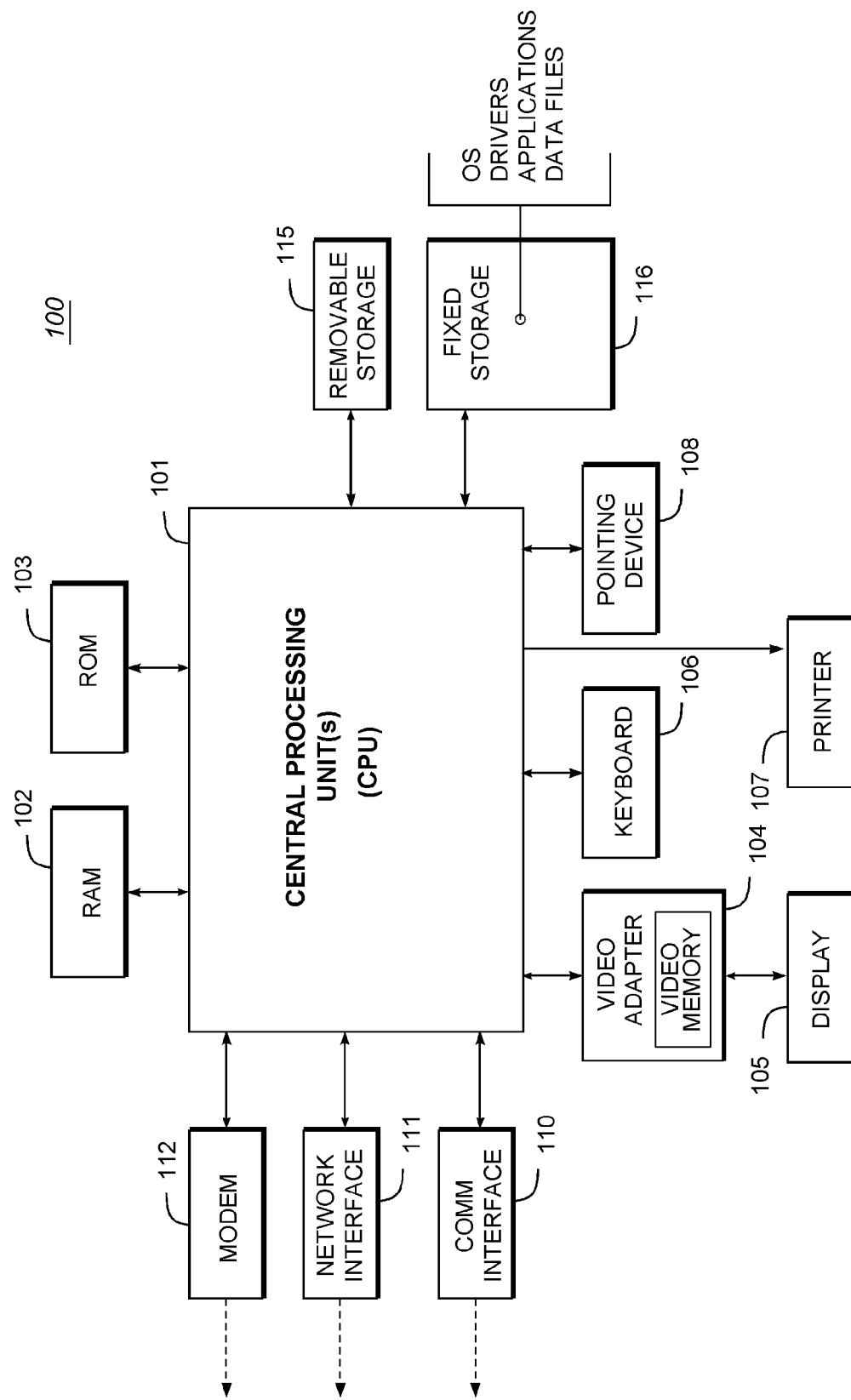
FIG. 1 is a block diagram of a computer system in which software-implemented processes of the present invention may be embodied.

The following definitions are offered for purposes of illustration, not limitation, in order to assist with understanding the discussion that follows.

3G: This is an ITU specification for the third generation (analog cellular was the first generation, digital PCS the second) of mobile communications technology. 3G promises increased bandwidth, up to 384 Kbps when a device is stationary or moving at pedestrian speed, 128 Kbps in a car, and 2 Mbps in fixed applications. 3G will work over wireless air interfaces such as GSM, TDMA, and CDMA.

Digital watermark: A pattern of bits inserted into a digital image, audio file, or video file that includes identification information, such as the file's copyright information (author, rights, etc.). The name comes from the faintly visible watermarks imprinted on stationery that identify the manufacturer of the stationery. The primary purpose of digital watermarks is to provide copyright protection for intellectual property that is in digital format.

DRM: Short for digital rights management, a system for protecting the copyrights of data circulated via the Internet by enabling secure distribution and/or disabling illegal distribution of the data. Typically, a DRM system protects intellectual property by either encrypting the data so that it can only be accessed by authorized users or marking the content with a digital watermark or similar method so that the content can not be freely distributed. See, e.g., IETF Internet DRM Working Group (currently at www.idrm.org).

GPRS: Short for General Packet Radio Service, a standard for wireless communications which runs at speeds up to 115 kilobits per second, compared with current GSM (Global System for Mobile Communications) systems' 9.6 kilobits. GPRS, which supports a wide range of bandwidths, is an efficient use of limited bandwidth and is particularly suited for sending and receiving small bursts of data, such as e-mail and Web browsing, as well as large volumes of data.

GSM: Short for Global System for Mobile Communications, one of the leading digital cellular systems. GSM uses narrow-band TDMA, which allows eight simultaneous calls on the same radio frequency.

Media: Refers broadly to any content that may be represented in digital form, such as audio, video, images, documents, or the like.

MM1 (also, MMS Library): A library or protocol that allows a mobile client to send and receive messages containing a variety of media types, e.g., text, voice, image and video clips using Multimedia Messaging Services (MMS).

MM7: This protocol consists of abstract request and response messages. As distinct from the earlier interfaces between VASP (Value Added Service Platform) applications and MMS Relay/Server, MM7 is a common vendor-independent protocol. MM7 protocol is based on the concept of Web Services and uses SOAP and HTTP for communication. The multimedia messages are sent to the MMS Relay/Server with HTTP POST method. The body of the post contains XML data about the delivery and the multimedia message as a MIME-multi-part attachment.

MMS: Short for Multimedia Message Service, a store-and-forward method of transmitting graphics, video clips, sound files and short text messages over wireless networks using the WAP protocol. Carriers deploy special servers, dubbed MMS Centers (MMSCs) to implement the offerings on their systems. MMS also supports e-mail addressing, so the device can send e-mails directly to an e-mail address. Mobile and other similar user devices may compose e-mail-like messages that contain one or more media items (e.g., images, audio, video, text, and the like), that may be sent to another subscriber. The most common use of MMS is for communication between mobile phones.

TCP/IP: Stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., RFC 1180: A TCP/IP Tutorial, the disclosure of which is hereby incorporated by reference. A copy of RFC 1180 is available on the Internet (e.g., currently from ietf.org).

WAP: Short for the Wireless Application Protocol, a secure specification that allows users to access information instantly via handheld wireless devices such as mobile phones, pagers, two-way radios, smart phones, and communicators.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
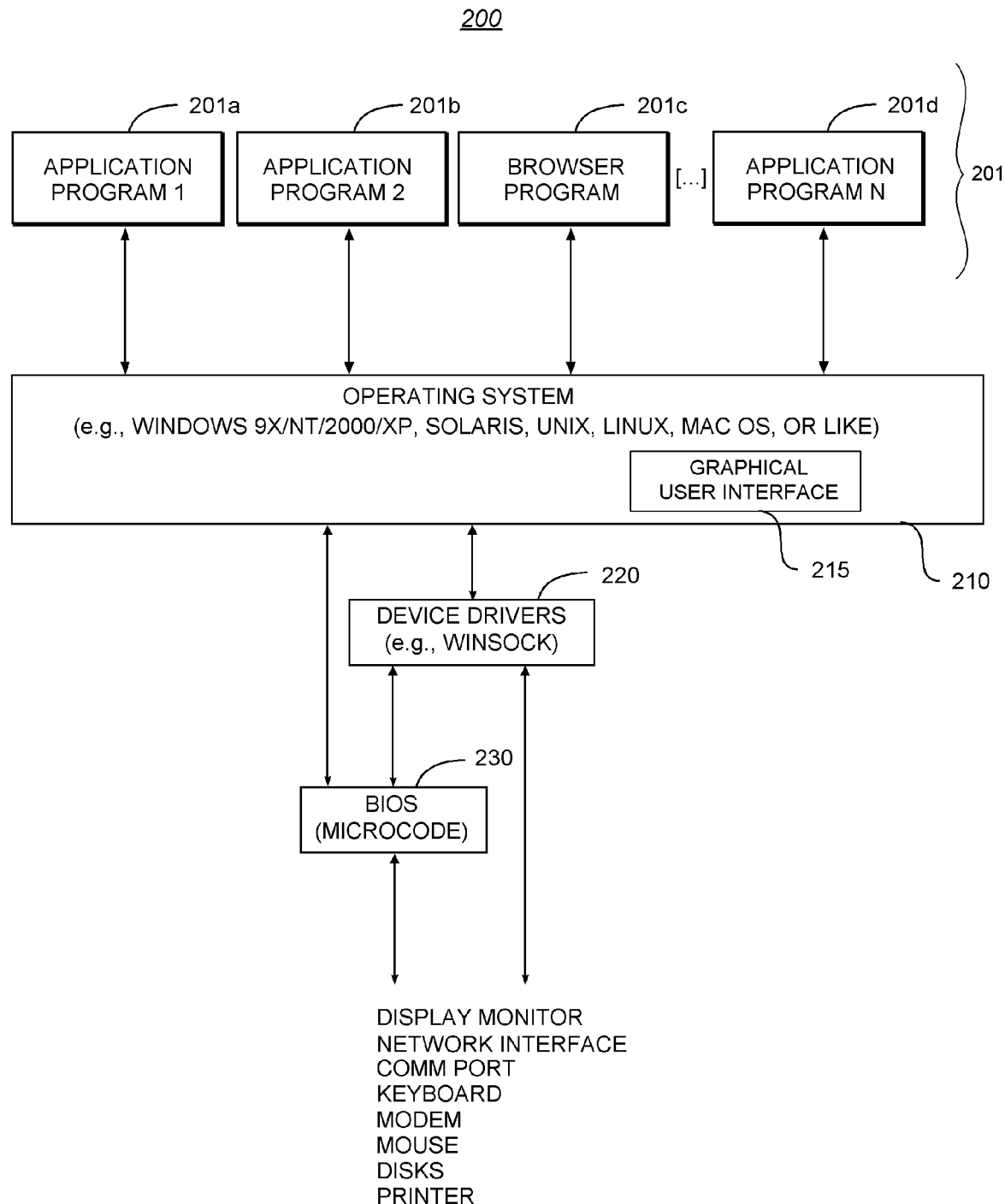
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples of a preferred embodiment in which it will be assumed that there exist one or more "servers" (e.g., message switch server and media object reference identifier module server) that communicate with one or more "clients" (e.g., wireless terminals, handheld devices, desktop computers, and/or the like). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Restoration of Original Media Quality in Messaging Environments

From a high-level perspective, the present invention seeks to use one or more already-available data communication channels that exist within the encoding of various media objects, so that a given original media object may be referenced or indexed for future use. As messages containing a given media object are passed through a switching center, the individual switching center may obtain a reference for the media object—the original reference identifier—using the methodology of the present invention, and embed or associate that reference with the media object. In one embodiment, the switching center may retain both the original reference identifier and an original copy of the media object so that any subsequent decimated copy that is used may be re-associated with the original copy, thereby allowing the system to in effect create a higher-quality, first generation copy for the target device. Each decimated copy retains enough information (by the embedded or associated original reference identifier) to allow the copy to be re-associated with the original media object.

In the currently preferred embodiment, the present invention is implemented in a message switch-based environment. A "switch" is usually embodied as software and hardware components that exist at the carrier's infrastructure (e.g., at a wireless cellular network). In an MMS-based switch, for example, a server component is used to listen for the receipt of messages from mobile terminals (e.g., data processing-enabled cellular phones) on well-known ports, using typical Internet-like connectivity mechanisms. As these systems are usually subscription based, the switch typically includes a module for identifying/validating/billing the subscriber terminals that connect. The server includes functionality for decoding the requests from the mobile terminals that comprise the transmission of one or more multimedia objects, as part of a standards-defined multimedia message. The switch includes switching capability in the form of target/destination resolution, using a variety of address resolution schemes. As part of that target/destination resolution, the switch includes functionality (or default rules) that allows it to transmit a media object in its original quality (uncommon) or to decimate the object, as required for the particular capabilities of a given destination (e.g., for display on a small screen of a hand-held device). After a message is delivered to a given destination, the message no longer exists, except for potential archiving purposes. However, the message, including all of it multimedia context components, is at that point no longer available for all practical purposes to subscriber terminals.

System Components

Figure 3A:
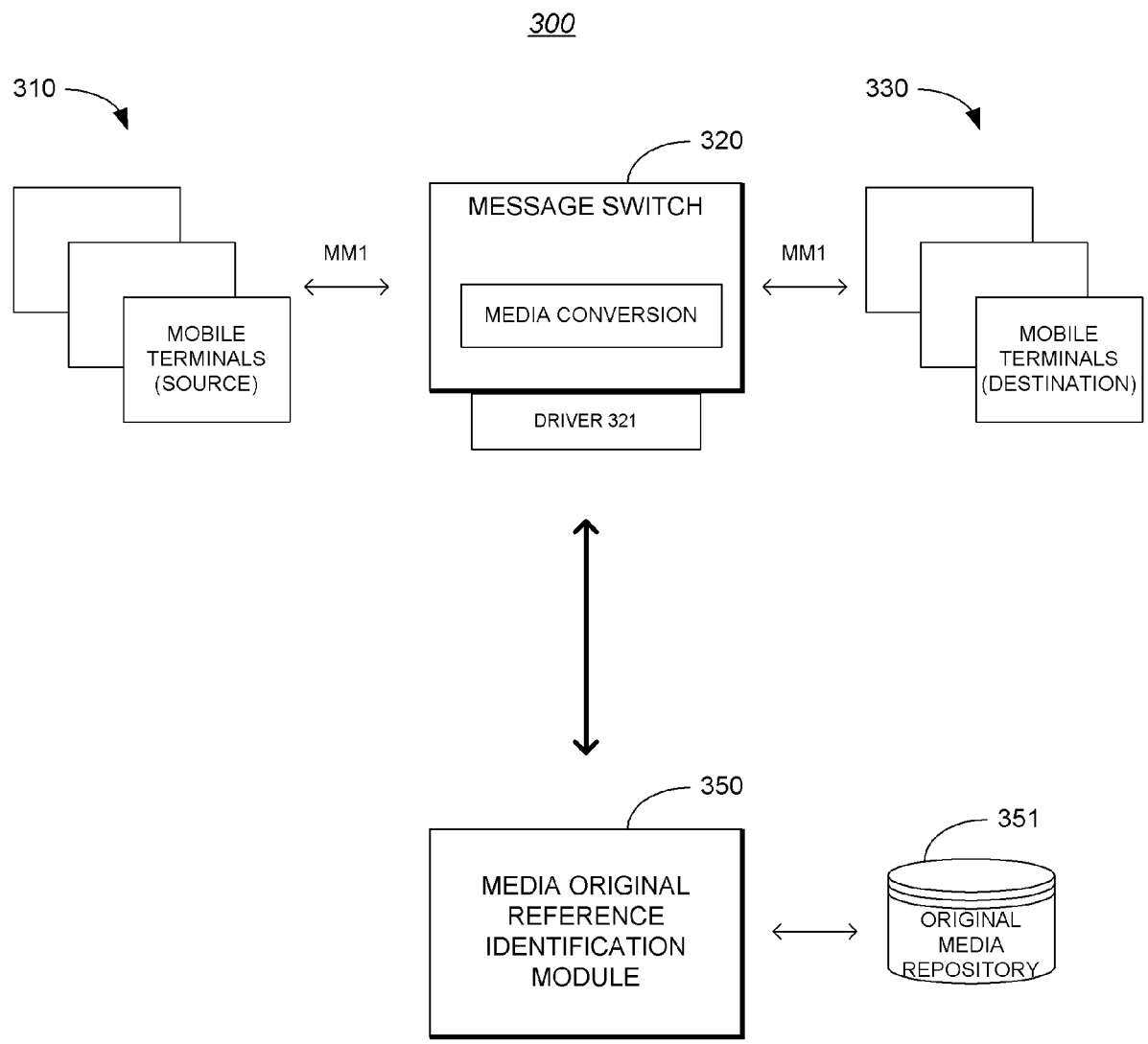
FIG. 3A is a block diagram that illustrates a high-level view of a system providing restoration of original media quality in a messaging environment.

FIG. 3A is a block diagram that illustrates a high-level view of a system 300 providing restoration of original media quality in a messaging environment. As shown, the system includes a message switch 320 connected to mobile terminals 310, 330, which typically comprise "smart" cellular phones (e.g., with microprocessor and display screen) and the like. In operation, the message switch 320 communicates by sending messages using the MM1 protocol. The message switch 320, which may include the Nokia MMS-C message switch or similar product, includes a media conversion facility. Although mobile terminals 310, 330 are shown as separate source and destination terminals for purposes of illustration, typically any given terminal may serve as a source for messages (source mobile terminals 310) or a destination for messages (destination mobile terminals 330). Further, the present invention does not require that these source and destination terminals in fact be mobile. Instead, they need only be clients capable of sending or receiving multimedia messages. In a typical embodiment, these clients will be mobile devices of various capabilities.

As also shown, the system 300 includes a media original reference identification module 350 of the present invention, which in turn has access to an original media repository 351. In the currently preferred embodiment, the module 350 is embodied as a server that communicates with the message switch 320 via an application protocol (e.g., MM7 protocol).

This protocol includes the capability to bear arbitrary application commands. This protocol is employed to define a set of application services that allow the module 350 to communicate with the message switch 320 in a manner that allows original reference identifiers to be provided for media objects passing through the system. The message switch 320, depending on architecture, may include a plug-in module or driver facilitating communication with the module 350. In the currently preferred embodiment, an object reference identifier (ORI) service driver 321 is employed for this purpose.

The module 350 may be viewed as an add-on module for the message switch 320. Message traffic passing through the message switch 320 may be trapped or "hooked", by the above mentioned plug-in or driver. Upon trapping a given message, the message switch 320 provides the module 350 with a message identifier (subscriber information, etc.) and all media objects of the message. In response, the module 350 may assign an original reference identifier (ORI) for the message, as well as each media object of the message. The ORI-identifiable media may now be stored in the original media repository 351, for future use. The repository 351 may be implemented in a conventional database, such as Oracle 9 (available from Oracle Corp. of Redwood Shores, Calif.). In the currently preferred embodiment, the repository 351 employs an aging mechanism so that stale or obsolete items are eventually "aged out" (removed) from storage.

In basic operation, the module 350 embeds the ORI information within each of the media objects. The particular technique used to embed the ORI information within a given media object will depend on the underlying media type (e.g., JPEG, MP3, etc.) for the object. The modified media object (i.e., with the embedded ORI information) is returned to the message switch 320 as a substitute for the original object. This substitute, which is an ORI-embellished copy that retains the original's quality, may now be transformed or converted (as required, if any) and sent to the target destination. The ORI-embedded information is immune to any transformation or conversion, and thus will be preserved in the copy that is sent to the target destination. The result is that decimated media contains ORI-embedded information that allows identification of an original copy.

Because the terminals all communicate through the message switch 320, the ORI service driver 321 constantly monitors incoming media for ORI-embedded information. Accordingly, the message switch 320 may re-associate an incoming decimated media object (coming in from a terminal) with the original media object, if that original had been seen previously by the message switch. In basic operation at this point, the message switch 320 hands the incoming message to the ORI service driver 321. The re-association of a decimated media object with its original may be done (i.e., by the module 350 and repository 351) in a manner that is transparent to the message switch 320.

Figure 3B:
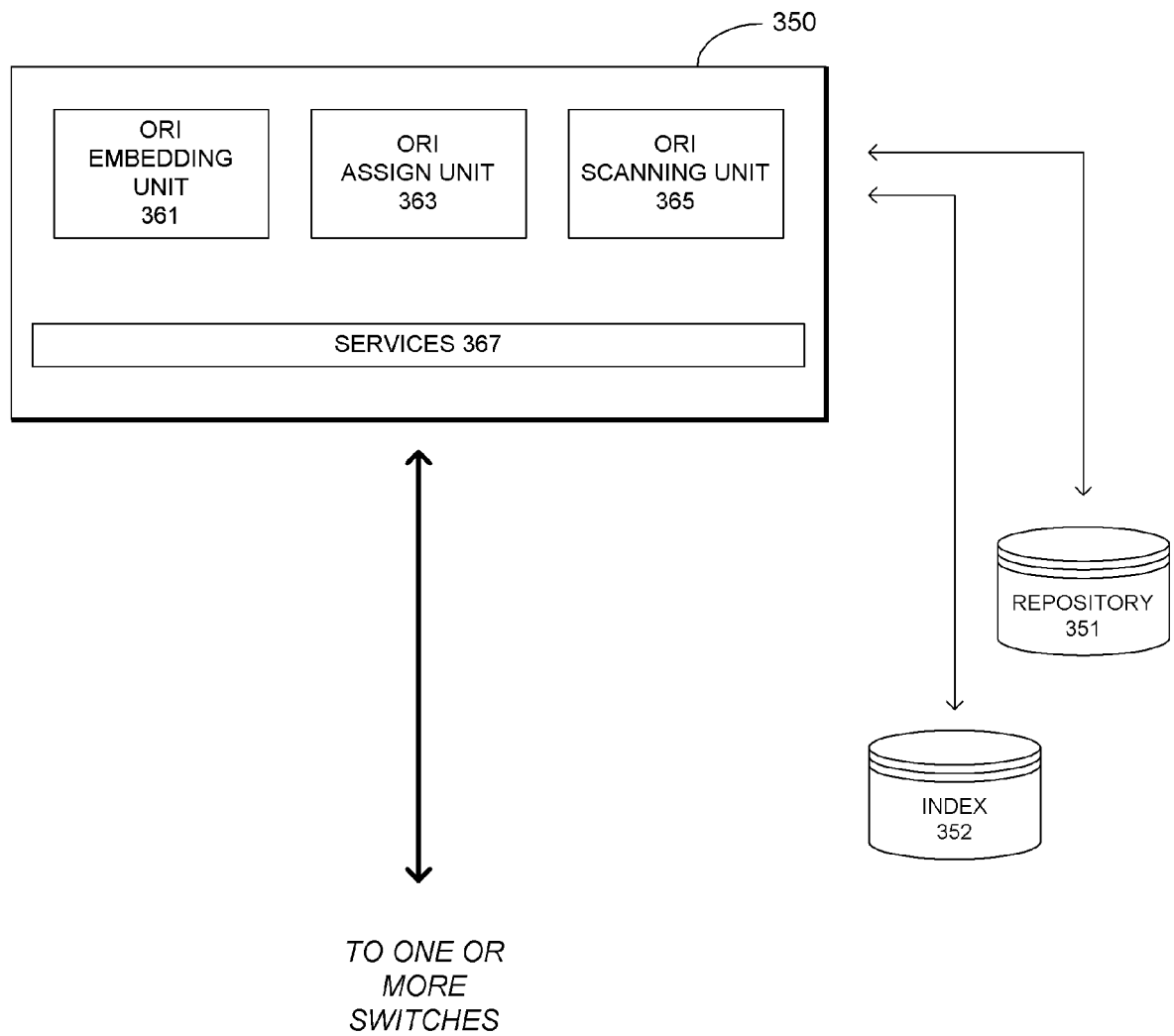
FIG. 3B is a block diagram that provides a more detailed view of the media original reference identification module.

FIG. 3B is a block diagram that provides a more detailed view of the media original reference identification module 350. As shown, the module 350 includes ORI embedding unit 361, ORI assign unit 363, ORI scanning unit 365, and services layer 367. As previously mentioned, the module 350 connects to a repository 351 that stores media objects. The repository 351 may be optionally indexed (e.g., by ORI value), as indicated by index 352, to facilitate object access and retrieval.

The ORI embedding unit 361 includes program logic for embedding an ORI value in a given media object. Accordingly, the unit 361 includes knowledge about different media types, so that it may embed an ORI value in a media object of a particular type in a manner that will allow the embedded value to survive any subsequent transformation (e.g., such as applied by the message switch 320). The ORI assign unit 363 includes program logic for formulating an ORI reference value, in instances where a newly-encountered media object is presented at the message switch 320 (i.e., presentation of new media). The ORI scanning unit 365 includes program logic to scan incoming media objects for any embedded ORI information. In instances where decimated media with embedded ORI information is encountered, the scanning unit 365 may re-associate the decimated media with the ORI-maintained original (in the repository 351). The services layer 367 provides application protocol services or interface(s) that allow the module 350 to communicate with one or more switches. The interface(s) includes command support for the aforementioned embedding, assigning, and scanning features, including forwarding media objects to the module 350 for storage and returning substitute (reconstituted) media objects to the message switch 320.

This approach solves the problem of the continued destruction of the fidelity/quality of media objects that pass through existing multimedia messaging systems. Further, because a copy of the original media object may be located, the system has the opportunity to provide additional value-added services, such as print fulfillment, additional transformations (e.g., scaling, cropping, etc.), or the like. These additional value-added services would be unattractive or not feasible if instead the system were processing a decimated copy (i.e., given the level of noise introduction produced by decimations). In this manner, any service that is preferably performed against a source object may now be easily integrated into the system, by using the ORI information provided by the present invention. For example, if a user received a decimated image on a hand-held PDA device, that user may still order a high-quality version of that image (e.g., as print fulfillment, T-shirt, coffee mug, key chain, or the like).

While the preferred embodiment has been illustrated as an add-on unit for an existing message switch, a first alternative embodiment may be created such that the media ORI module 350 includes direct connectivity to terminals or clients. In such an embodiment, therefore, the media ORI module 350 is modified to include connectivity functionality (e.g., HTTP and TCP/IP connectivity) for allowing the module to host sessions with individual terminals. In particular, the Internet may be used as an interface to bear the same application commands between terminals and the media ORI module 350, that were done between the message switch 320 and the module 350. In such an embodiment, mobile terminals may communicate with the ORI module 350 directly via the Internet, and enjoy the same benefits described above that are available as a result of being able to identify the original media source (notwithstanding the fact that the mobile terminal may have itself only received a decimated copy). Typically, the terminals or clients would include client-side logic for facilitating communication with the module 350. The client-side logic may be pre-existing (e.g., installed driver) or downloaded dynamically (e.g., Java script, ActiveX control, or the like).

A second alternative embodiment may be created such that a portion (or all) of the functionality of the media ORI module 350 is pushed out to the individual terminals or clients. Embodiment of even a portion of the module 350 at the clients may allow some of the workload to be distributed over a number of machines, thus potentially improving throughput. Additionally, if clients are able to ascertain that media does not have ORI information, network communication for this particular process is avoided. Storage of original source media may be maintained centrally (e.g., in a central repository) or may be maintained at the respective clients (i.e., retrieved using peer-to-peer technique). These clients may participate in regular message switching systems/services, but they on their own have the ability to re-create the source (in its original fidelity). This improves the overall performance of the existing switching system, since clients then will present original source media, not decimated copies.

Detailed Operation

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for down-loading and installation from an Internet location (e.g., Web server).

Methodology for Handling Incoming New Media

Figure 4A:
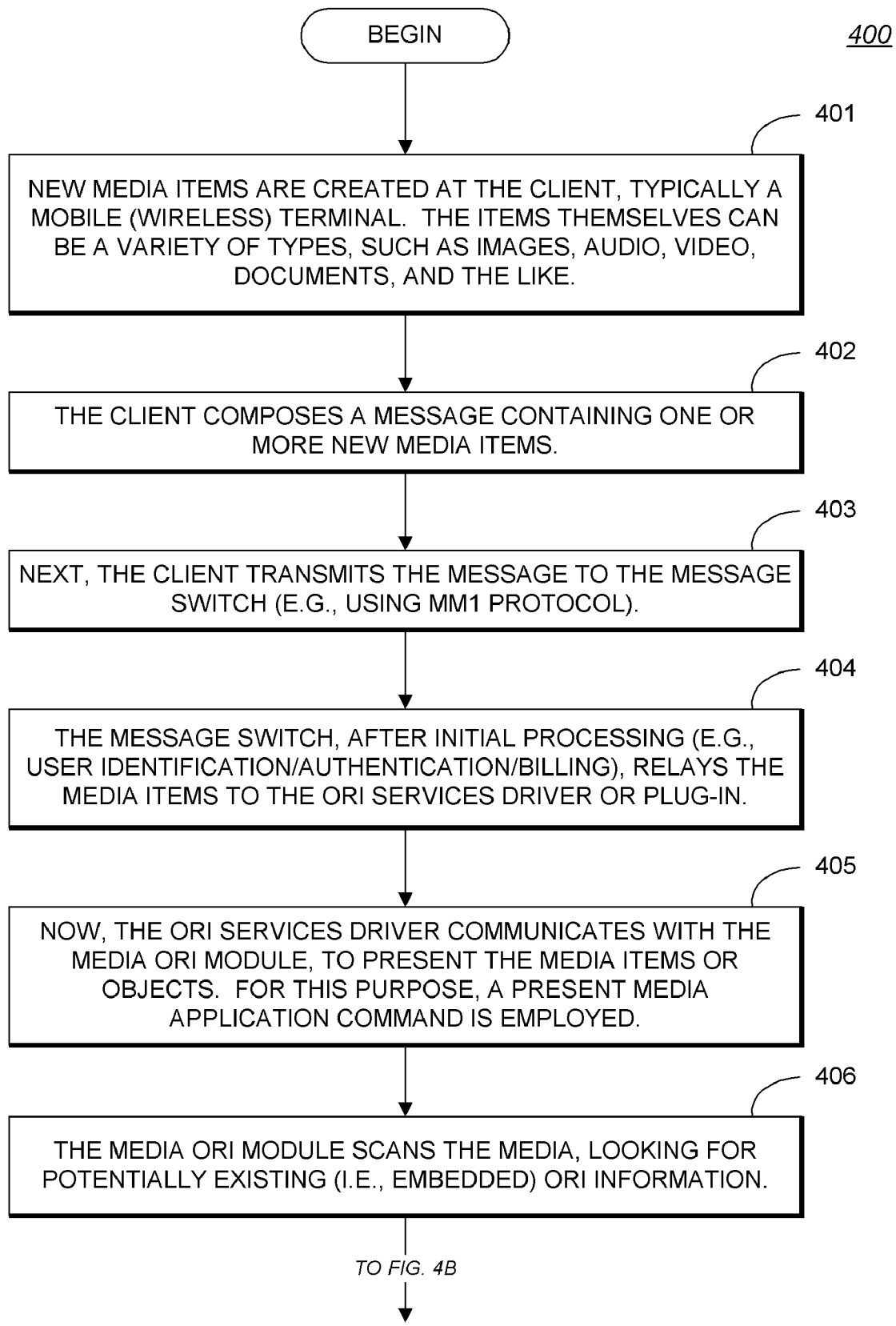
FIGS. 4A-B comprise a flowchart illustrating a method of the present invention for handling new or original incoming media.
Figure 4B:
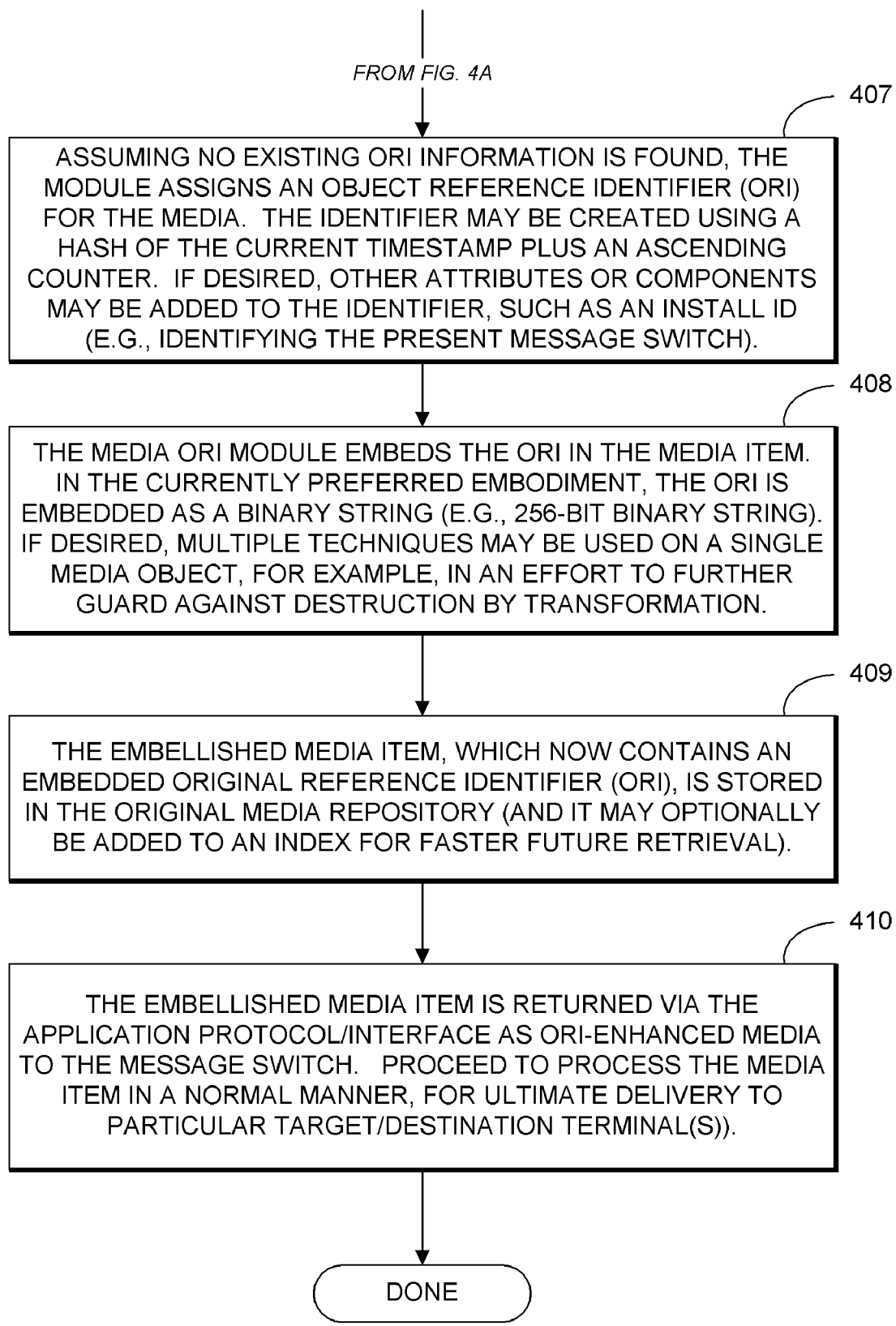

FIGS. 4A-B illustrate a method 400 of the present invention for handling new incoming media (i.e., media without ORI information); for purposes of illustration, the method is illustrated at the point that new media items are created. At step 401, new media items are created at the client, typically a mobile (wireless) terminal. The items themselves can be a variety of types, such as images, audio, video, documents, and the like. At step 402, the client composes a message containing one or more new media items. Next, the client transmits the message to the message switch (e.g., using the MM1 protocol), as indicated at step 403. The message switch, after initial processing (e.g., user identification/authentication/billing), relays the media items to the ORI services driver or plug-in, at step 404. (Typically, the services driver would reside on the same machine as the message switch.)

Now, at step 405, the ORI services driver communicates with the media ORI module, to present the media items or objects. For this purpose, a "Present Media" application command is employed. At step 406, the media ORI module scans the media, looking for potentially existing (i.e., embedded) ORI information. Assuming no existing ORI information is found, the module assigns an object reference identifier (ORI) for the media, at step 407. The identifier may be created using a hash of the current times-tamp plus an ascending counter. If desired, other attributes or components may be added to the identifier, such as an install ID (e.g., identifying the present message switch). Other potential techniques may be used to create the identifier. All that is required for the method is that the identifier be unique (over the design life of the product for the domain of media objects reasonably expected to be encountered).

At step 408, the media ORI module embeds the ORI in the media item. In the currently preferred embodiment, the ORI is embedded as a binary string (e.g., 256-bit binary string). A number of techniques exist for embedding information within media objects or items. For example, most standard media types include a header that permits storage of arbitrary data, such as storage within a header of an image file or a control channel of a video (e.g., MPEG-4) file. Alternatively, one could use a watermark approach to interleave information with the underlying media data itself (with human-imperceptible loss of quality). Similarly, newer media types include digital rights management (DRM) features that allow additional information, for example, to be added or piggybacked onto a DRM subchannel. Although a variety of techniques are potentially available for embedding information, the particular technique chosen for a given media type should be one that allows the embedded information to be resilient/redundant to decimation. If desired, multiple techniques may be used on a single media object, for example, in an effort to further guard against destruction by transformation.

All told, redundant mechanisms based on existing media encoding may be used to embed ORI information in a manner that will survive decimation of a given media type. It is worth noting that although an embedded ORI identifier may not be guaranteed to survive all possible decimations, the identifier typically will not interfere with media rendering/processing and thus will not serve as a point of failure. In other words, although encoding of certain media types may create difficulty for embedding the identifier, the embedding itself creates no downside since it will not lead to failure of rendering/processing. Therefore, the ORI may be lost in certain failure modes, but in such a case the media object simply reverts back to an ordinary media object (i.e., one not embellished with ORI information).

At step 409, the embellished media item, which now contains an embedded original reference identifier (ORI), is stored in the original media repository (and it may optionally be added to an index for faster future retrieval). Finally, at step 410, the embellished media item is returned via the application protocol/interface as ORI-enhanced media to the message switch, which may now proceed to process the media item in a normal manner (e.g., transform and deliver it in a multimedia message destined for particular target/destination terminal(s)). Since the ORI survives decimation, further use of the media item may be done in a manner that allows re-association with the original source media (as will next be described).

Methodology for Handling Incoming Known (ORI-Embellished) Media

Figure 5A:
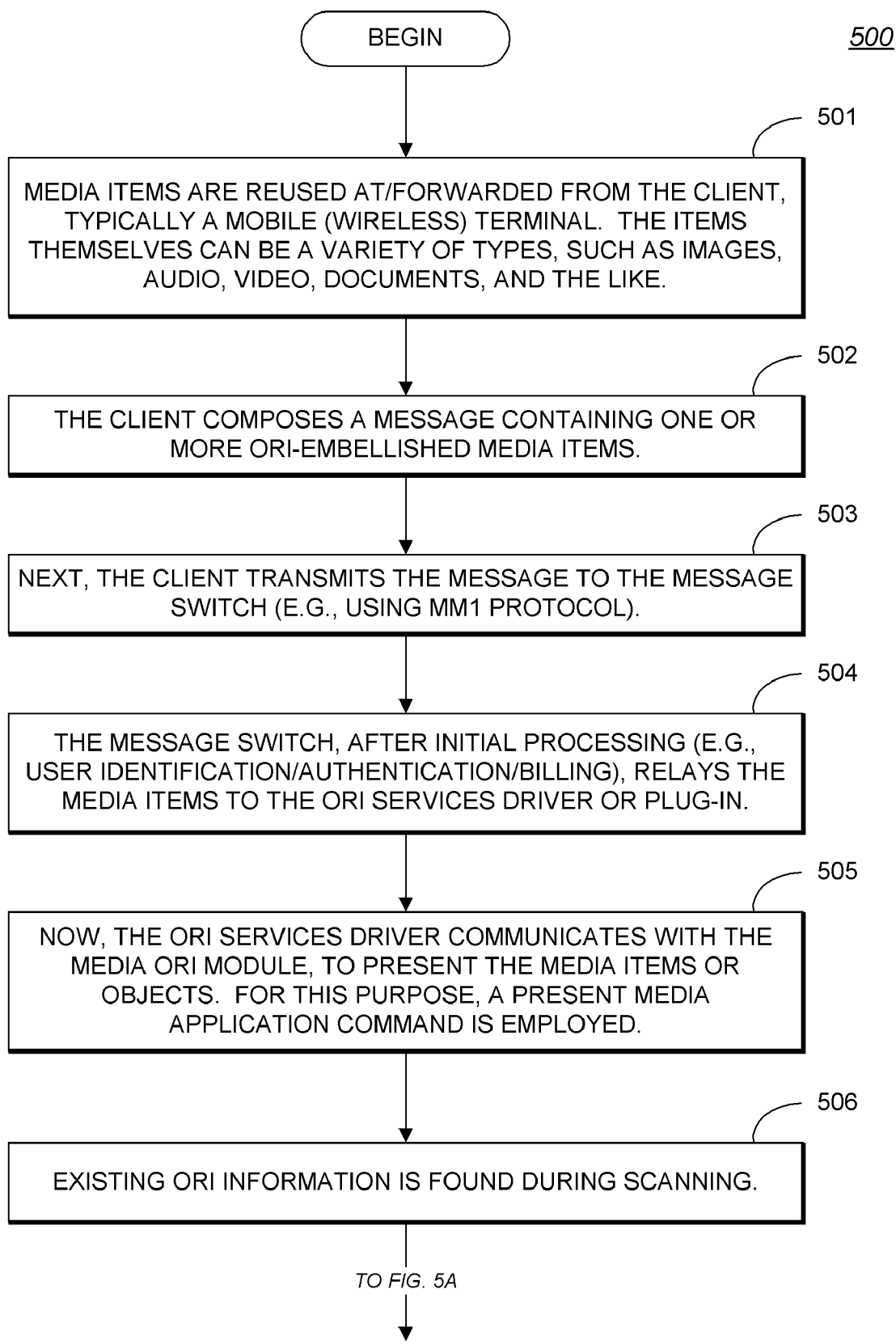
FIGS. 5A-B comprise a flowchart illustrating a method of the present invention for processing incoming media objects that contain ORI (object reference identifier) information.
Figure 5B:
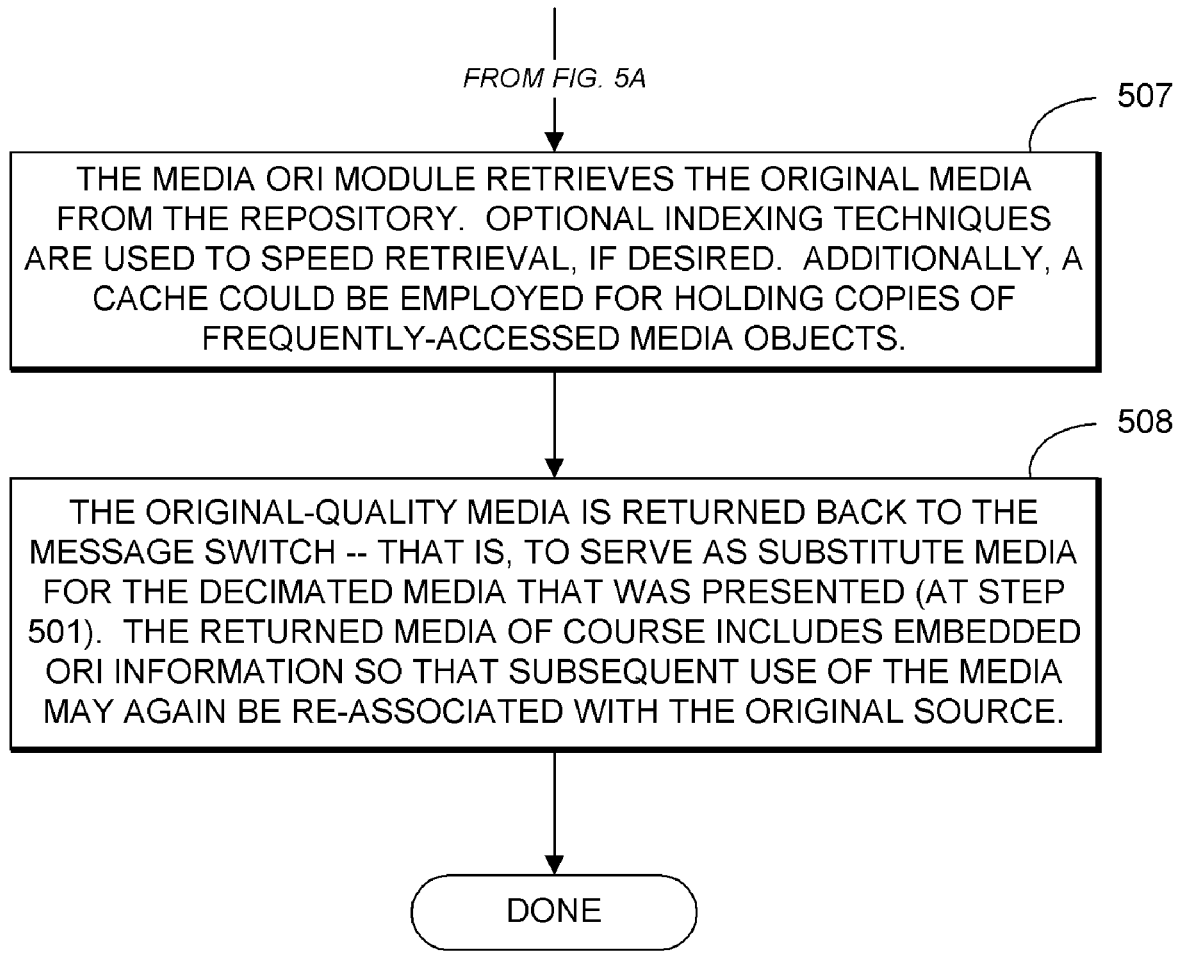

FIGS. 5A-B comprise a flowchart of a method 500 for processing incoming media objects that contain ORI information. Several of the initial steps are the same as the method 400. In particular, steps 401-405 are essentially repeated for the method 500, except that the incoming media object is now one that does contain ORI information. Therefore, steps 501-505 are shown essentially unchanged from the method 400. At the sixth step (corresponding to step 406), existing ORI information is found during scanning. This is indicated at step 506. At step 507, the media ORI module retrieves the original media from the repository. Optional indexing techniques are used to speed retrieval, if desired. Additionally, a cache could be employed for holding copies of frequently-accessed media objects. Now, at step 508, the original-quality media is returned back to the message switch—that is, to serve as substitute media for the decimated media that was presented (at step 501). The returned media of course includes embedded ORI information so that subsequent use of the media may again be re-associated with the original source. If desired, the return of original-quality media may be contingent upon the user's rights (i.e., privilege level), for example, based on DRM information contained within the presented media.

Embedding of Original Reference Identifier (ORI) in Media

As previously described, the original reference identifier (ORI) may be embedded in media. Many image formats, especially JPEG, provide the ability to store textual and binary thumbnail metadata within the file itself. Digital cameras, scanners and other imaging equipment will often generate technical data and store it in an image in a more or less standard format known as the Exchangeable Image File Format or EXIF.

Figure 6:
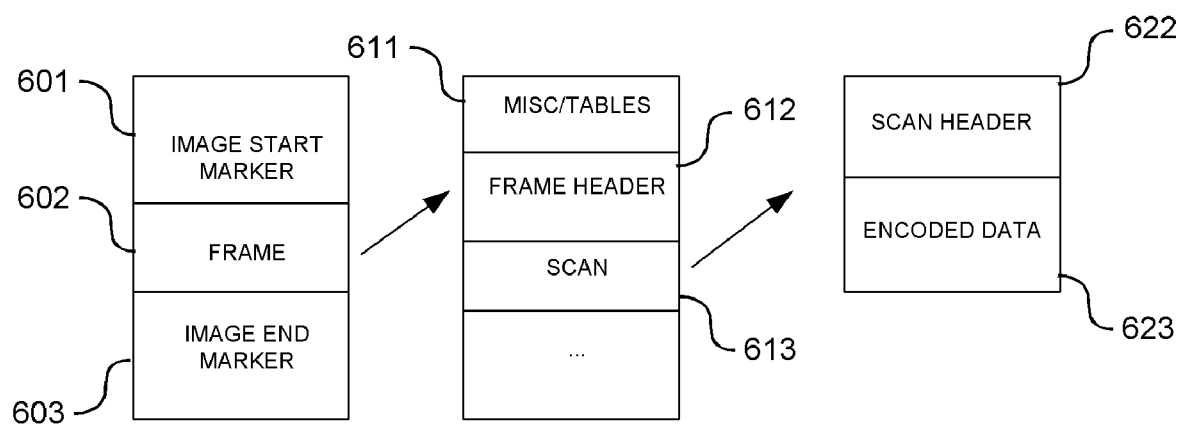
FIG. 6 is a simplified block diagram of the JPEG image file format, for illustrating the embedding of ORI information in a media object.

In one embodiment of the present invention, the ORI is embedded in a JPEG media object. FIG. 6 is a simplified block diagram of the JPEG image file format. Although there are additional headers and marker fields described in the standard specification for JPEG, they are considered optional, and in the interests of clarity of description, are omitted from the figure. The fields are as follows.

Image Start Marker (601): A two-byte sequence that denotes the start of a JPEG image (0xFF 0xD8)

Image End Marker (603): Similar to the Image Start Marker, but found at the end (0xFF 0xD9)

Frame (602): The Frame represents the beginning of actual image data. A JPEG file can contain at most one Frame.

Misc/Tables Section (611): The JPEG format allows for arbitrary amounts of information to be embedded in the headers of an image, using application-specific encodings. The format itself stores some necessary information in this section, including the quantization matrix, and Huffman codes.

Frame Header (612): The frame header includes important information about the structure of the frame that follows, including the number of lines, the number of samples in each line, and the list of components in the image.

Scan (613): A scan represents a single pass, or a single component of the image. For example, a black and white image could be encoded in a single scan, while a color image would typically take multiple scans.

Scan Header (622): The Scan Header contains information necessary to decode the data (like which Quantization table to use), and information necessary to put that data in the right place once it has been decoded (like x and y scaling factors).

Encoded Data (623): Encoded Data is the output of the JPEG encoding process.

Of particular interest herein is the Misc/Tables Section 611, which allows for arbitrary amounts of information to be embedded in the headers of an image, using application-specific encodings. The section may be used to accommodate application-specific encoding for the purpose of embedding or hiding ORI information without visibly affecting the image quality and without being easily removed during transformation. For a JPEG media object, the ORI (object reference identifier) embedding unit 361 may include program logic for identifying the JPEG media type by using the two-byte sequence that denotes the start of a JPEG image (0xFF 0xD8). The ORI assign unit 363 includes program logic for assigning a new ORI value for an incoming media object that has never been seen before and places that ORI value (e.g., as a binary string) in the Section 611, using application-specific encodings. In this manner, arbitrary binary data may be embedded within the media object, thus allowing each decimated copy to retain enough information (via the ORI) to allow the copy to be re-associated with the original media object.

In another embodiment, a digital watermark technique may be employed. Content providers have a need to embed signals into video/multimedia data, including audio data, which can subsequently be detected by software and/or hardware devices for purposes of authenticating copyright ownership, controlling copying and display, and ownership management. The watermark itself is an identification code that is embedded in the original digital data and is preferably imperceptible to the human observer of the artistic work. One example of a scheme for watermarking involves inserting an identification string into a digital audio signal to substitute the insignificant bits of randomly selected audio samples with the bits of an identification code. Another example of watermarking relating to watermarking video digital works involves assigning a predetermined value to a predetermined coding parameter that, when modified, requires further parameters to be modified in order to correctly decode the video signal. In one watermarking technique, each copy of an object is marked with an identifier code.

Digital watermarks are typically used to mark each individual copy of a digitized work with information identifying the title, copyright holder, and even the licensed owner of a particular copy. Watermarks can also serve to allow for secured metering and support of other distribution systems of given media content and relevant information associated with them, including addresses, protocols, billing, pricing, or distribution path parameters, among the many things that could constitute a "watermark." For example, U.S. Pat. No. 5,905,800 to Moskowitz et al. describes a method for applying a digital watermark to a content signal. As a another example, U.S. Pat. No. 5,991,426 to Cox et al. describes a technique where a digital watermark is inserted into multimedia data. As yet another example, U.S. Pat. No. 6,611,599 to Natarajan describes a watermarking technique that includes encrypting a message derived from source data on the digital object. The foregoing patent references are hereby incorporated by reference.

For those media objects already employing digital watermarks (suitable for surviving transformations), the ORI information may be incorporated into the watermarks themselves, thus eliminating the need to encode the ORI information in a separate field (e.g., header field) of the media object. In accordance with the present invention, the ORI (object reference identifier) embedding unit 361 may include program logic for identifying a particular watermark type by using the watermark's signature type (e.g., byte sequence). The ORI assign unit 363 includes program logic for assigning a new ORI value for an incoming media object that has never been seen before and places that ORI value (e.g., as a binary string) in the watermark, using encoding appropriate for the particular watermark. As with the JPEG embodiment, each decimated copy can retain enough information via the ORI to allow the copy to be re-associated with the original media object. It should be appreciated by those skilled in the art that the methodology described herein for use with digital watermarks is not tied to a particular watermarking technique but, instead, is suitable for use with any digital watermark capable of surviving transformations/decimation to a point that would allow extraction or reconstitution of the ORI information.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. In a messaging system, a method for restoring media items to an original quality, the method comprising:
   upon receipt of a message containing a media item having original resolution quality by a switching center, storing the media item having original resolution quality in a repository by a server;
   generating an identifier for identifying the media item having original resolution quality stored in the repository by the server;
   embedding the identifier in the media item having original resolution quality stored in the repository by the server;
   replacing the media item in the received message with a copy of the identifier- embedded media item having original resolution quality stored in the repository by the switching center; and
   upon future encounter by the switching center of a message sent by a source node to a destination node, wherein the source node is different from the destination node, the message containing an identifier-embedded media item no longer having original resolution quality, substituting, by the switching center, the identifier-embedded media item no longer having original resolution quality in the encountered message with a copy of the identifier-embedded media item having original resolution quality stored in the repository using said identifier.

2. The method of claim 1, wherein said media item having original resolution quality comprises a component in user-composed messages.

3. The method of claim 1, wherein said messaging system comprises Multimedia Messaging Service (MMS).

4. The method of claim 1, wherein said replacing includes: using an available data communications channel that exists for encoding said media item having original resolution quality, in order to encode said identifier.

5. The method of claim 1, wherein said messaging system comprises a message switch-based system.

6. The method of claim 1, wherein said messaging system is able to allow transmission of a given media item in its original resolution quality or decimate the given media item, as required for a given destination.

7. The method of claim 1, wherein the message containing a media item having original resolution quality is received from a mobile terminal.

8. The method of claim 7, wherein the mobile terminal communicates via a multimedia messaging protocol.

9. The method of claim 1, wherein said identifier comprises an object reference identifier.

10. The method of claim 9, wherein said object reference identifier is capable of being embedded in the media item having original resolution quality.

11. The method of claim 10, wherein the object reference identifier is embedded in a header of the media item having original resolution quality.

12. The method of claim 11, wherein said media item having original resolution quality comprises a JPEG image, and wherein the object reference identifier is embedded in a header for the JPEG image.

13. The method of claim 1, wherein the identifier is embedded in the media item having original resolution quality as a binary text string.

14. The method of claim 13, wherein the binary text string contains sufficient information to allow retrieval of a copy of the media item having original resolution quality stored in the repository.

15. The method of claim 1, wherein the identifier employed for the media item having original resolution quality depends on the media item having original resolution quality type.

16. The method of claim 1, wherein said substituting includes: scanning incoming media items for any preexisting identifiers.

17. The method of claim 16, further comprising:
if an incoming media item does not have a preexisting identifier, assigning a new identifier for that incoming media item.

18. The method of claim 1, further comprising: removing from the repository any media item that is stale.

19. The method of claim 18, wherein said removing includes applying an aging mechanism to determine media items that are stale.

20. The method of claim 1, wherein the identifier is embedded in a digital watermark employed for the media item having original resolution quality.

21. The method of claim 1, wherein said media item having original resolution quality comprises an image, and wherein the identifier is embedded in a digital watermark for the image.

22. The method of claim 1, wherein the identifier is embedded in a digital watermark for the media item having original resolution quality, said identifier be embedded as a binary text string.

23. The method of claim 1, wherein steps of the method are performed at a server computer that connects to mobile terminals.

24. The method of claim 1, wherein at least some steps of the method are performed at mobile terminals, for providing distributed processing.

25. The method of claim 1, wherein said message is transmitted via the Internet from a client device to a server.

26. The method of claim 1, wherein the identifier-embedded media item is a reduced size image smaller than the media item having original resolution quality.

27. A computer-readable medium having processor-executable instructions for performing the method of claim 1.

28. A memory storing downloadable set of processor-executable instructions for performing the method of claim 1.

29. A system for restoring media items to original quality, the system comprising:
a messaging system in a network capable of transmitting multimedia messages;
a repository for storing media items having original resolution quality upon receipt of a message containing a media item having original resolution quality;
a module for generating an identifier for identifying the media item having original resolution quality stored in the repository and for embedding the identifier in the media item having original resolution quality stored in the repository;
a module for replacing the media item having original resolution quality in the message with a copy of the identifier-embedded media item having original resolution quality stored in the repository; and
a module for substituting an identifier-embedded media item no longer having original resolution quality in a message sent by a source node to a destination node, wherein the source node is different from the destination node, with a copy of the identifier-embedded media item having original resolution quality stored in the repository using said identifier.

30. The system of claim 29, wherein said media item having original resolution quality comprises a component in user-composed messages.

31. The system of claim 29, wherein said messaging system comprises Multimedia Messaging Service (MMS).

32. The system of claim 29, wherein said module for replacing includes: module for using an available data communications channel that exists for encoding said media item having original resolution quality, in order to encode said identifier.

33. The system of claim 29, wherein said messaging system comprises a message switch-based system.

34. The system of claim 29, wherein said messaging system is able to allow transmission of a given media item in its original resolution quality or decimate the given media item, as required for a given destination.

35. The system of claim 29, wherein the message containing a media item having original resolution quality is received from a mobile terminal.

36. The system of claim 35, wherein the mobile terminal communicates via a multimedia messaging protocol.

37. The system of claim 29, wherein said identifier comprises an object reference identifier.

38. The system of claim 37, wherein said object reference identifier is capable of being embedded in the media item having original resolution quality stored in the repository.

39. The system of claim 38, wherein the object reference identifier is embedded in a header of the media item having original resolution quality stored in the repository.

40. The system of claim 39, wherein said media item having original resolution quality stored in the repository comprises a JPEG image, and wherein the object reference identifier is embedded in a header for the JPEG image.

41. The system of claim 29, wherein the identifier is embedded in the media item having original resolution quality stored in the repository as a binary text string.

42. The system of claim 41, wherein the binary text string contains sufficient information to allow retrieval of a copy of the media item having original resolution quality stored in the repository.

43. The system of claim 29, wherein the identifier employed for the media item having original resolution quality stored in the repository depends on the media item's type.

44. The system of claim 29, wherein said module for substituting includes: a module for scanning incoming media items for any preexisting identifiers.

45. The system of claim 44, further comprising:
module for assigning a new identifier for that incoming media item, if an incoming media item does not have a preexisting identifier.

46. The system of claim 29, further comprising: module for removing from the repository any media item that is stale.

47. The system of claim 46, wherein said module for removing includes applying an aging mechanism to determine media items that are stale.

48. The system of claim 29, wherein the identifier is embedded in a digital watermark employed for the media item having original resolution quality stored in the repository.

49. The system of claim 29, wherein said media item having original resolution quality stored in the repository comprises an image, and wherein the identifier is embedded in a digital watermark for the image.

50. The system of claim 29, wherein the identifier is embedded in a digital watermark for the media item having original resolution quality stored in the repository, said identifier be embedded as a binary text string.

51. The system of claim 29, wherein certain modules reside at a server computer that connects to mobile terminals.

52. The system of claim 29, wherein at least some modules reside at mobile terminals, for providing distributed processing.

53. The system of claim 29, wherein said message is transmitted via the Internet from a client device to a server.

54. The system of claim 29, wherein the identifier-embedded media item no longer having original resolution quality is a reduced size image smaller than the media item having original quality.

* * * * *